Feb. 20, 1962   H. O. HOLZ   3,021,931
FRICTION CLUTCH MECHANISM
Filed April 1, 1958   2 Sheets-Sheet 1
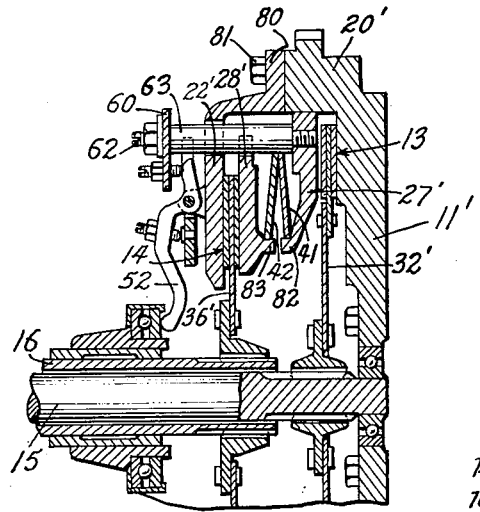
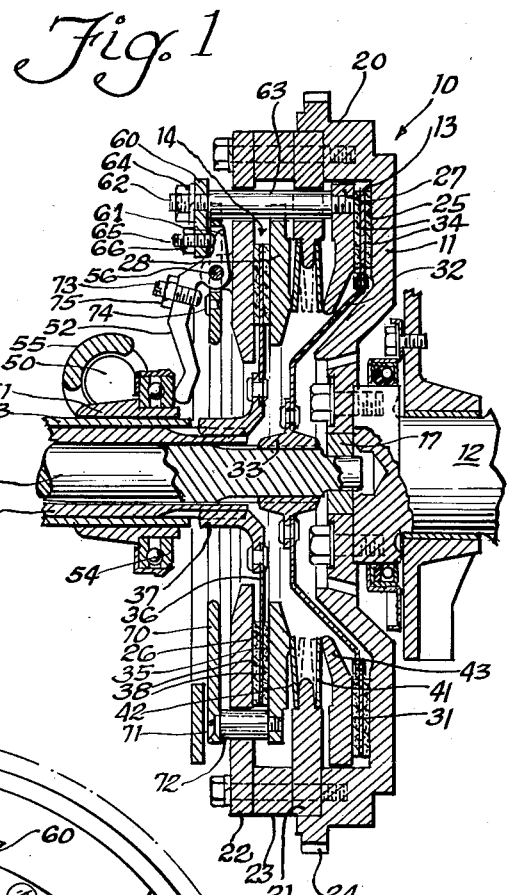
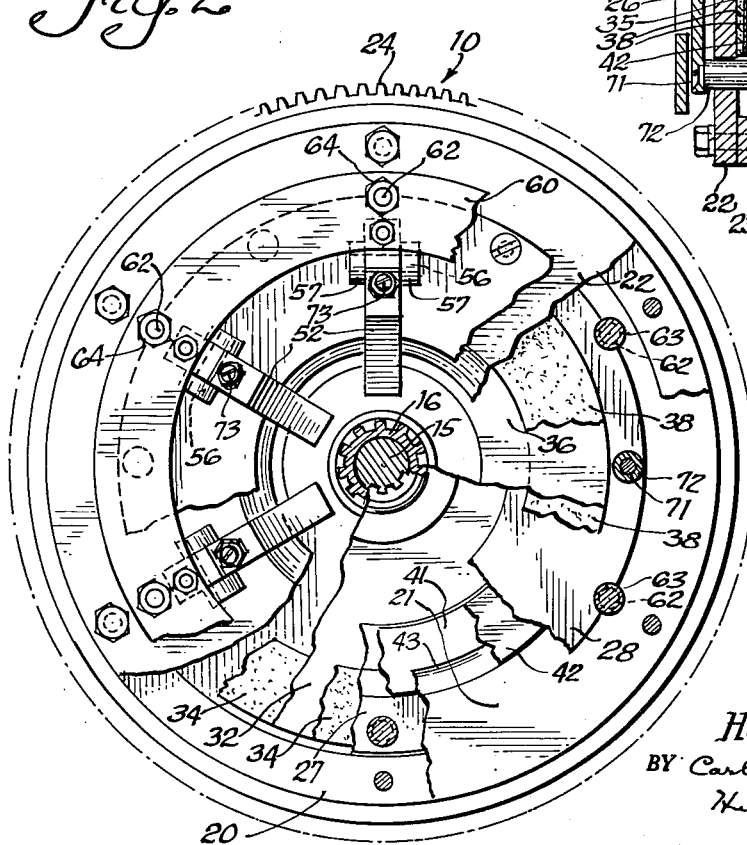
INVENTOR.
Harold O. Holz
BY Carlson, Pitzner,
Hubbard & Wolfe
Att'ys Feb. 20, 1962    H. O. HOLZ    3,021,931
FRICTION CLUTCH MECHANISM
Filed April 1, 1958    2 Sheets-Sheet 2

INVENTOR.
Harold O. Holz
BY Carlson, Pitzner,
Hubbard & Wolfe
Att'ys

United States Patent Office 3,021,931
Patented Feb. 20, 1962

3,021,931
FRICTION CLUTCH MECHANISM
Harold O. Holz, Detroit, Mich., assignor to Massey-Ferguson Inc., Racine, Wis., a corporation of Maryland
Filed Apr. 1, 1958, Ser. No. 725,772
4 Claims. (Cl. 192—48)

The invention relates to friction clutches generally, and more particularly to an improved dual friction clutch mechanism providing independent but correlated control of two shafts driven from a common source of power, such as the drive shaft of a tractor or comparable vehicle and a power take-off shaft on the vehicle. The present application is a continuation-in-part of my prior application, Serial No. 416,735, filed March 17, 1954, allowed October 18, 1957 and now abandoned.

One object of the invention is to provide a clutch mechanism of the above general character which enables the tractor drive to be engaged and disengaged without interfering with the power take-off drive or alternatively allows both drives to be engaged and disengaged by manipulation of a single control member, such as a hand lever or a foot pedal.

Another object is to provide a clutch mechanism for independently driving two shafts from a common source of power which is readily adjustable to effect either simultaneous or sequential engagement or disengagement of the drives for the shafts.

A more specific object is to provide a dual clutch mechanism constructed and arranged so that the order in which the clutches are actuated in sequence may be varied by a simple adjustment.

Still another object is to provide a dual clutch mechanism which is simple and rugged in construction easy to install and service, efficient and dependable in operation and which can be manufactured at relatively low cost.

Other objects and advantages of the invention will become apparent from the following detailed description of the preferred embodiment illustrated in the accompanying drawings in which FIGURE 1 is a transverse sectional view through a dual clutch mechanism embodying the features of the invention.

FIG. 2 is a rear elevational view of the clutch mechanism with parts broken away to show the relationship of the various elements.

FIG. 5 is a fragmentary transverse sectional view of a modified form of the clutch mechanism showing the front clutch disengaged and the rear clutch engaged.

Figure 3:
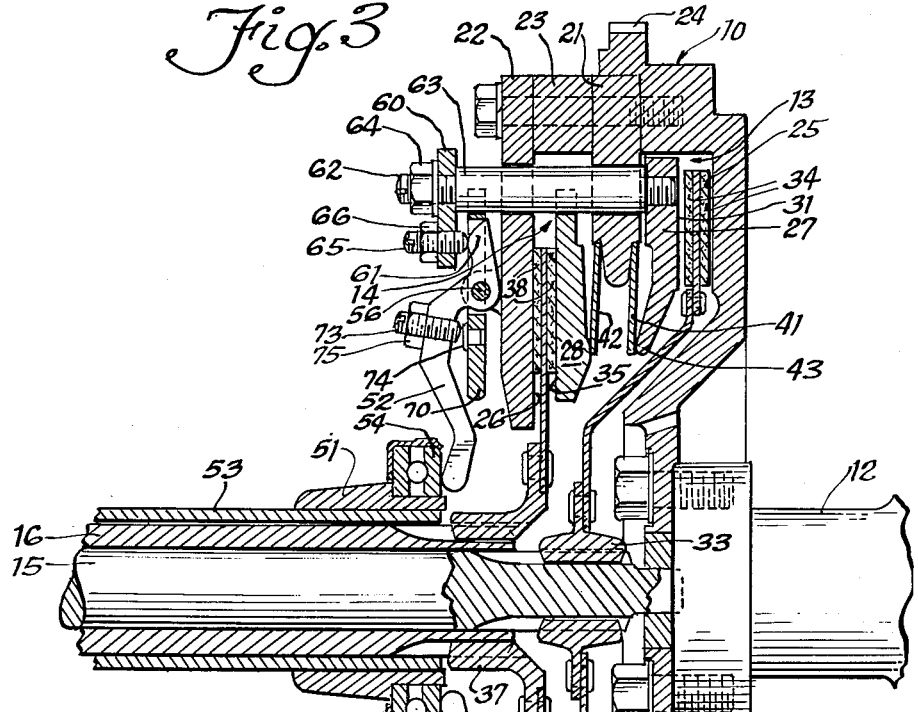
FIG. 3 is a fragmentary transverse sectional view of the clutch mechanism on a slightly enlarged scale showing one of the clutches engaged and the other disengaged.

While the invention has been shown and will be described herein as embodied in a preferred form of dual clutch mechanism, it is to be understood that the detailed disclosure is exemplary and is not intended to limit the invention. The intention is to cover all modifications and alternative constructions falling within the spirit and scope of the invention as expressed in the appended claims.

For purposes of illustration, the exemplary clutch mechanism has been shown as having a rotatable driving member 10 comprising a flywheel 11 adapted to be bolted or otherwise rigidly secured to the crankshaft 12 of an engine. The exemplary clutch mechanism includes two independently engageable and disengageable clutches, namely, a front clutch 13 and a rear clutch 14 which respectively provide driving connections from the driving member 10 to two separate driven shafts 15 and 16. As herein shown, the shaft 16 is tubular and the shaft 15 extends coaxially through it and is piloted at its forward end in a bearing 17 carried in a recess in the flywheel 11. The front clutch 13, in this instance, is operatively associated with the inner shaft 15 while the rear clutch 14 is associated with the outer shaft 16. When incorporated in a tractor, the shaft 15 may be utilized to drive the ground wheels of the tractor through a change-speed gear box while the shaft 16 is utilized to drive a power take-off shaft.

In accordance with the invention, the clutches 13 and 14 are associated with the driving member in a manner which simplifies the construtcion of the parts, reduces the number of parts required and provides a very rugged and dependable clutch mechanism capable of operating efficiently under the severe conditions imposed on such mechanism in the tractor field. To this end, the flywheel 11 is formed with a peripheral flange 20 to which is bolted or otherwise secured an annular abutment member 21 and an annular casing member 22 separated by a spacing ring 23. The flange of the flywheel may be formed with external gear teeth 24 for engagement with a starter gear.

The flywheel 11 has its rear face machined to present a flat annular friction driving surface 25 coaxial with the rotational axis of the flywheel. Similarly, the front or inner face of the casing member 22 is machined to provide a flat annular friction driving surface 26 coaxial with the rotational axis of the flywheel and spaced axially from the driving surface 25.

The elements of the front and rear clutches, with the exception of the actuating mechanism to be described later, are all enclosed within the flywheel and casing assembly, thus providing a compact structure and affording maximum protection for the clutch elements. Such elements include a front pressure plate 27 disposed adjacent the rear face of the flywheel 11 and a rear pressure plate 28 disposed adjacent the front face of the casing member 22. The pressure plates may conveniently be of annular form and each is drivingly coupled with the driving member 10 as will appear presently. While the pressure plates are thus constrained to rotate with the flywheel, the coupling permits them to be shifted axially toward and from the driving surfaces of the driving member 10.

As herein shown, the front pressure plate 27 has its forward face machined to provide a friction driving surface 31 in opposed relation to the driving surface 25 on the flywheel. Interposed between this pressure plate and the flywheel is the driven element of the front clutch 13, herein shown as a dish-shaped member 32 having a hub portion 33 splined or otherwise nonrotatably secured to the inner shaft 15. Attached to the marginal edge portion of the member 32 at opposite sides are a pair of friction rings 34 positioned for coaction respectively with the driving surfaces 25 and 31 and operative to provide a driving connection between the member 10 and the shaft 15 when clamped between the clutch plate 27 and the flywheel.

The rear pressure plate 28 has its back face machined to provide a friction driving surface 35 in opposed relation to the driving surface 26 on the casing member 22. The driven element of the rear clutch 14 is interposed between the last mentioned driving surfaces, the element comprising in this instance a disc 36 having a hub 37 splined to the outer shaft 16. The disc 36 carries at its outer marginal edge a pair of friction rings 38 positioned for coaction with the driving surfaces 26 and 35 and effective to provide a driving connection between the member 10 and the shaft 16 when clamped between the clutch plate 28 and the casing member 22.

In the preferred form of the clutch mechanism, the clutch plates 27 and 28 are spring biased to clutch engaging position, that is, both the front and rear clutches are normally engaged. While any suitable spring means may be utilized for that purpose, it is preferred to employ annular springs 41 and 42 of the type commonly known as Belleville springs. As shown, the spring 41 is interposed between a shoulder on the abutment member 21 and a rearwardly inclined flange 43 extending around the inner marginal edge of clutch plate 27. The spring 42 is interposed between a shoulder on the other side of the abutment plate and the rear clutch plate 28. Accordingly, the springs are normally effective to maintain the front and rear clutches engaged for driving the shafts 15 and 16.

In the operation of a tractor, changes in clutch settings usually have to be made at a time when the driver is busiest with the manipulation of other controls. The present invention simplifies and facilitates the making of such changes by providing novel actuating mechanism whereby one or both of the clutches may be actuated through the unidirectional shifting of a single shiftable operating member, wherein the extent of movement of the operating member determines whether one or both clutches are actuated. The operating member may be of any suitable type such as a hand lever or foot pedal, the latter being preferred in a tractor.

In the exemplary embodiment of the clutch actuating mechanism, the control member is arranged to act through a rock shaft 50, an actuating element 51 and a series of clutch throw-out levers 52 to retract the clutch plates 27 and 28 against the biasing springs 41 and 42 to disengage the front and rear clutches. Re-engagement of the clutches results from the action of the biasing springs upon the release of the operating member.

As shown in FIG. 1, the actuating element 51 comprises a sleeve axially slidable on a tubular housing 53 enclosing the shafts 15 and 16 and terminating closely adjacent the rear of the clutch mechanism. The sleeve carries a thrust ring 54 for engagement with the throw-out levers 52, the ring being mounted on antifriction bearings so that it may rotate freely with the throw-out levers when in engagement therewith. The rock shaft 50, which is suitably journaled on the tractor housing, shifts the sleeve 51 by means of a fork 55 nonrotatably attached to the shaft 50.

The throw-out levers 52, of which three may be used, although six have been shown in the exemplary clutch mechanism, are uniformly spaced apart around the back of the assembly. The individual levers are disposed substantially radially of the assembly with fulcrums adjacent their outer ends on the casing member 22 and with their inner ends positioned for engagement by the thrust ring 54 in the forward movement of the actuating element. As shown, the fulcrum for each lever is provided by a pivot pin 56 carried between a pair of lugs 57 projecting from the rear face of the casing member 22.

The throw-out levers 52 are associated with the clutch plates 27 and 28 by clutch operating mechanism effective upon rocking of the levers in a counterclockwise direction from the normal rest position shown in FIG. 1 to retract the clutch plates 27 and 28 against the biasing springs and thus disengage the two clutches. Conversely, upon release of pressure on the inner ends of the levers, the springs 41 and 42 shift the clutch plates back to clutch engaging positions and return the levers 52 to rest position. Provision is made for adjusting the operating mechanism so that disengagement of the two clutches may take place simultaneously or sequentially as desired with either clutch being actuated ahead of the other.

For actuation of the front clutch 13, the operating mechanism comprises an extension of the front clutch plate 27, herein shown as an annular member 60, overlying the tip portions 61 of the levers 52 outwardly of their fulcrums 56. The member 60 is rigidly secured to the plate 27 in spaced parallel relation thereto by a series of studs 62 and spacer sleeves 63. The studs are threaded into the plate 27 and extend rearwardly therefrom through suitable openings in the member 21, the plate 28 and the casing member 22. Nuts 64 threaded on the studs hold the member 60 securely against the spacer sleeves in a rigid unitary assembly. A series of contact screws 65 threaded through the member 60 provide adjustable contacts between the levers 52 and the member, as will appear presently. Lock nuts 66 threaded on the screws hold them in adjusted position.

Actuation of the rear clutch plate 28 is effected through an extension of that plate for coaction with the levers 52. This extension is also shown as an annular member 70 rigidly attached to the plate 28 by screws 71 and positioned with respect thereto by spacer sleeves 72. The member 70 in this instance is disposed in underlying relation to the throw-out levers 52 for engagement by the levers as they swing inwardly on their fulcrums. As shown, such engagement is effected through the medium of adjustable contact screws 73 threaded into the levers and coacting with wear pads 74 on the member. Lock nut 75 holds the contact screws in adjusted positions.

In operation, one or both of the clutches may be disengaged by shifting the actuating element 51 forwardly along the housing 53. Whether the disengagement occurs simultaneously or sequentially depends upon the adjustment of the contact screws 65 and 73. When installed in a tractor with the inner shaft 15 serving as the tractor drive shaft, and the outer shaft as the power take-off drive shaft, the contact screws will ordinarily be adjusted to effect disengagement of the front clutch 13 while the rear clutch 14 remains engaged. This permits the tractor drive to be interrupted for shifting gears or the like without stopping the power take-off, which is advantageous in the operation of combines and comparable implements.

With the adjustments above described, initial forward movement of the actuating element 51 to the position shown in FIG. 3, rocks the throw-out levers 52 into engagement with the contact screws 65 to retract the front clutch plate 27 against the force exerted by the spring 41. Upon retraction of the clutch plate, the driven clutch member 32 is released from frictional driving engagement with the driving surfaces 25 and 31 of the flywheel and front clutch plate. Transmission of power to the shaft 15 is thus interrupted while the shaft 16 continues to be driven by the rear clutch.

Figure 4:
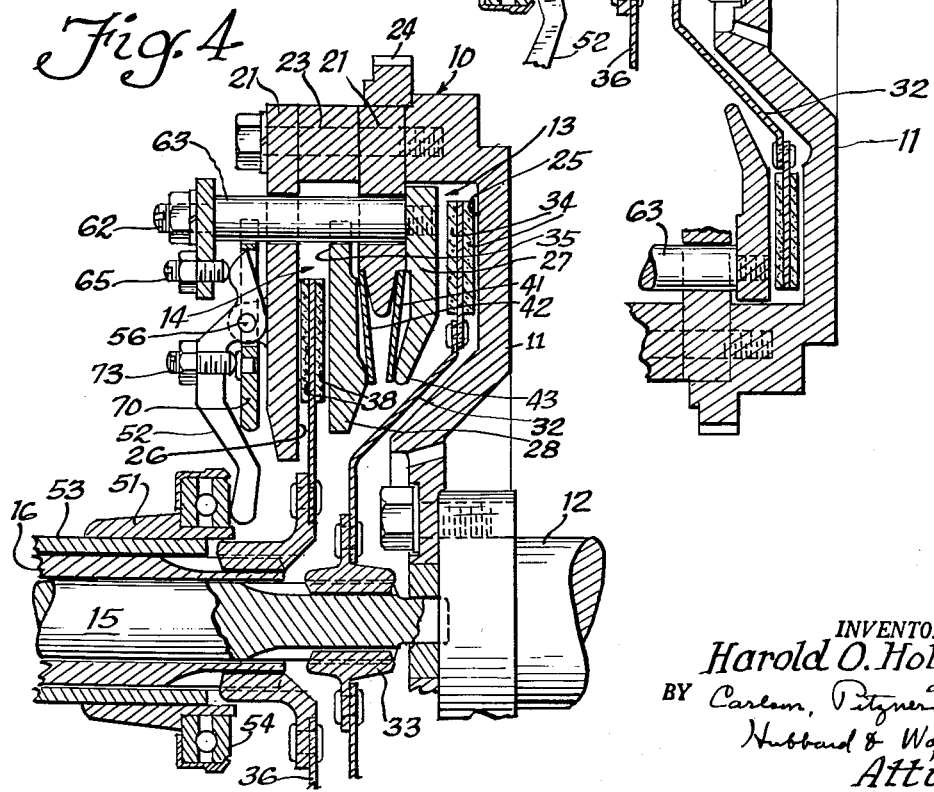
FIG. 4 is a fragmentary sectional view similar to FIG. 3 showing both clutches disengaged.

Further movement of the actuating element 51 in the same forward direction brings the contact screws 73 of the throw-out levers into engagement with the extension of the rear clutch plate 28. The rear clutch plate is shifted forwardly to the position shown in FIG. 4 against the force exerted by the spring 42, thus releasing the driven member 36 of the rear clutch from frictional contact with the driving surfaces 26 and 35 of the driven clutch member. The drive for the shaft 16 is thus interrupted and the front clutch is also maintained disengaged.

Upon release of the clutch operating member, the springs 41 and 42 return the associated clutch plates to engaged positions. In the adjusted condition above described, the clutches are re-engaged in the reverse order, that is, the rear clutch is engaged first followed by the engagement of the front clutch. The throw-out levers, of course, are returned to their normal rest position shown in FIG. 1.

By adjusting the positions of the contact screws 65 and 73, the timing of their engagement with the actuating elements of the clutches may be varied as desired. Thus, by appropriate adjustment of these screws, the throw-out levers can be rendered effective to withdraw the front and rear clutch plates together for disengaging the two clutches simultaneously. Likewise, by adjusting the screws 73 so that they engage the member 70 the throw-out levers engage the screws 65, the rear clutch will be disengaged before the front clutch is disengaged. Such adjustments may be effected very easily since the adjusting screws are mounted at the rear of the clutch assembly where they are conveniently accessible for that purpose.

The modified form of the clutch mechanism shown in FIG. 5 differs from the mechanism above described in that it is designed to eliminate the abutment member 21 and to simplify the construction of the flywheel and the driven member of the front clutch. To this end, the flywheel 11' comprises a flat disc with a peripheral flange 20' which, instead of being recessed for the accommodation of the abutment member, is formed with a flat face adapted to seat a flange 80 formed on and extending around the outer peripheral edge of the casing member 22'. The casing is rigidly secured to the flywheel flange as by screws 81.

A front pressure plate 27' and a rear pressure plate 28' are provided for pressing the driven clutch elements 32' and 36' of the front and rear clutches 13 and 14 against the friction surfaces of the flywheel and casing member, respectively. The clutch element 32' may constitute a flat disc instead of being dished like the clutch 32. As in the previously described clutch, the front pressure plate 27' is secured to the annular member 60 by a series of studs 62 each fitted with a spacer sleeve 63. The front and rear pressure plates 27' and 28' are urged toward engaged position by the Belleville springs 41 and 42 which, in this form of the clutch, have their outer marginal edges in abutting relation as shown in FIG. 5. Thus, each spring acts as an abutment member for the companion spring. The springs are retained in centered relation in the clutch mechanism by the spacers 63 engaging their outer peripheral edges and integral lips 82 and 83 on the pressure plates 27' and 28' engaging the inner peripheral edges of the springs.

Operation of the modified clutch mechanism is precisely like that of the previously described form.

It will be evident from the foregoing that the invention provides a dual friction clutch mechanism of novel and advantageous construction especially suited for use in tractors. The improved clutch mechanism provides separate drives for the tractor transmission and the power take-off and affords independent control for those drives which contribute substantially to the efficient operation of the tractor. By means of simple adjustments the clutch mechanism may be set to provide for either simultaneous or sequential engagement and disengagement of the clutches to meet the needs of the particular situation in which it is used. The clutch mechanism is dependable and rugged, easy to install and service, efficient and reliable in operation and its simple construction enables it to be manufactured at relatively low cost.

I claim as my invention:

1. In a clutch mechanism, in combination, a rotary driving member presenting a rearwardly facing friction driving surface on one face, said member having an annular peripheral flange extending rearwardly from said one face, a first member supported on said flange and extending inwardly therefrom to present an annular abutment in spaced relation to said one face, a second member supported on said first member and extending inwardly therefrom to present an annular friction driving surface opposed to said first driving surface and spaced from said abutment member, a pair of pressure plates disposed respectively at opposite sides of said abutment member and in operatively opposed relation to the respective friction driving surfaces, means supporting and guiding said plates for movement axially toward and from the adjacent friction driving surfaces and for rotation with said driving member, driven clutch elements interposed between the pressure plates and the respective adjacent friction driving surfaces, means releasably securing said first member and said second member to said driving member to facilitate assembly of said clutch elements therewith, extensions fixed to said pressure plates and projecting rearwardly of said second member, spring means acting between said first member and each of said pressure plates urging them in directions to drivingly engage said clutch elements with the associated friction surfaces, and a single set of clutch actuating levers pivoted on said second member in position to coact with said extensions to retract said pressure plates against their associated spring means and thereby disengage the drive for said clutch elements.

2. In a clutch mechanism, in combination, a rotary driving member presenting a rearwardly facing friction driving surface on one face, said driving member having an annular peripheral flange extending rearwardly from said one face, a first member supported on said flange and extending radially inwardly therefrom to present an annular abutment in spaced relation to said one face, a second member supported on said first member and extending radially inwardly therefrom to present an annular friction driving surface opposed to said first driving surface, a spacer ring element interposed between said first and second members, means detachably securing said first and second members and said ring to said driving member as a unit, a pair of pressure plates disposed respectively in operatively opposed relation to said friction driving surfaces, means supporting and guiding said plates for movement axially toward and from the respective friction surfaces, driven clutch elements interposed between the pressure plates and the adjacent friction driving surfaces, independent spring means acting between said first member and each of said pressure plates urging the plates in directions to drivingly engage said clutch elements with the friction driving surfaces, extensions from said pressure plates projecting at the rear of said second member, and a single set of clutch actuating levers pivoted on said second member for coaction with said extensions to retract said pressure plates against their associated spring means and thereby disengage the drive for said elements.

3. In a dual clutch mechanism, in combination, a rotatable driving member, a casing member secured to the rear face of said driving member, said members presenting front and rear axially spaced annular friction driving surfaces in opposed relation, a pair of pressure plates respectively disposed in opposed relation to said driving surfaces, means supporting and guiding said plates for movement toward and from the respective driving surfaces including a plurality of studs anchored to each of the plates and extending rearwardly of the casing member, the studs associated with the respective pressure plates being disposed in a circular series with the series associated with the front pressure plate having the larger diameter, a pair of driven clutch elements supported coaxially of said driving member between the respective pressure plates and the adjacent friction surfaces, spring means biasing said pressure plates in a direction to clamp said elements in friction driving engagement with the friction surfaces, a first annular operating member secured to the front plate studs at the rear of said casing member, a second annular operating member secured to the rear plate studs at the rear of said casing member, a series of levers pivoted on the rear face of said casing member between said annular operating member, one of said operating members normally engaging said levers at one side of their pivots and retaining them in retracted position by the action of said spring means when both of said clutch elements are drivingly engaged, said levers being operative through said first operating member in their initial movement from retracted position for withdrawing the front pressure plate to interrupt the driving engagement of the associated clutch element, and means at the other side of said pivots providing a lost motion mechanical connection between said levers and said second operating member operable upon further swinging of the levers in the same direction for retracting the rear pressure plate to free the other clutch element from driving engagement.

4. In a dual clutch mechanism, in combination, a flywheel presenting an annular friction driving surface on its rear face, an annular casing member secured to said flywheel and presenting a forwardly facing friction driving surface spaced axially from the friction surface on said flywheel, front and rear pressure plates disposed in facing relation to the respective friction surfaces, a series of studs secured to each pressure plate and extending rearwardly through apertures in said casing member supporting and guiding the pressure plates for movement toward and from the opposed friction surfaces, a driven clutch element disposed between each pressure plate and the adjacent friction surface, spring means disposed between said pressure plates urging them in directions to drivingly engage the respective clutch elements and their associated friction surfaces, means for disengaging said elements including a first annular operating member disposed at the rear of said casing member and rigidly secured to the studs extending from the front pressure plate, a second annular operating member of smaller diameter than said first member disposed at the rear of said casing member and rigidly secured to the studs extending from said rear pressure plates, and a series of levers pivoted on said casing member between said annular operating members in a position to urge one of said operating members in one direction and the other of said operating members in the opposite direction for retracting said pressure plates independently against the action of said spring means.

References Cited in the file of this patent
UNITED STATES PATENTS

| | | |
|---|---|---|
| 1,705,032 | Short | Mar. 12, 1929 |
| 2,057,559 | De Backer | Oct. 13, 1936 |
| 2,136,049 | Hering | Nov. 8, 1938 |
| 2,195,783 | Ravigneaux | Apr. 2, 1940 |
| 2,773,575 | Binder et al. | Dec. 11, 1956 |
| 2,899,897 | Ludwig | Aug. 18, 1959 |

FOREIGN PATENTS

| | | |
|---|---|---|
| 662,848 | Germany | July 22, 1938 |
| 864,187 | France | Jan. 13, 1941 |
| 1,015,291 | France | Sept. 15, 1952 |
| 897,343 | Germany | Nov. 19, 1953 |